United States Patent [19]

Garber

[11] 4,275,639
[45] Jun. 30, 1981

[54] PERISCOPIC SIGHT WITH A UNITARY LENS SYSTEM

[75] Inventor: Arnold L. Garber, San Jose, Calif.

[73] Assignee: FMC Corporation, San Jose, Calif.

[21] Appl. No.: 953,995

[22] Filed: Oct. 23, 1978

[51] Int. Cl.³ .............................................. F41G 1/40
[52] U.S. Cl. ...................................... 89/41 E; 350/52
[58] Field of Search ....................... 42/1 S; 89/41 E; 350/10, 21, 22, 23, 24, 52; 356/253, 254, 255

[56] References Cited

U.S. PATENT DOCUMENTS

| 683,204 | 9/1901 | Grubb | 89/41 E |
|---|---|---|---|
| 694,904 | 3/1902 | Youlten | 42/1 S |
| 725,839 | 4/1903 | Grubb | 350/10 |
| 2,307,759 | 1/1943 | Crawford | 89/41 E |
| 2,412,298 | 12/1946 | Siazik | 356/254 |
| 3,454,322 | 7/1969 | Scidmore et al. | 350/55 |

FOREIGN PATENT DOCUMENTS 853721  11/1960  United Kingdom ...................... 350/52

OTHER PUBLICATIONS

Donald H. Jacobs, Fundamentals of Optical Engineering, McGraw Hill, 1943, p. 197.
Redfield 1978 Rifle Scope Catalog, pp. 1-6.

Primary Examiner—Stephen C. Bentley
Attorney, Agent, or Firm—Robert S. Kelly; H. M. Stanley

[57] ABSTRACT

A periscopic sight is mounted to extend through the wall of protective armor surrounding a gun station. An elevation mirror is exposed to receive light from the direction in which the gun is pointing and to reflect the light along a vertical path extending through the sight. A sealed unitary lens system has a lens axis aligned with the vertical path and conducts the light therethrough to a stationary mirror accessible to the eye of an observer. The sealed unitary lens system has a sufficiently long eye relief to provide an unobstructed image to the observer in spite of the placement of the stationary mirror between the lens system and the observer.

7 Claims, 4 Drawing Figures

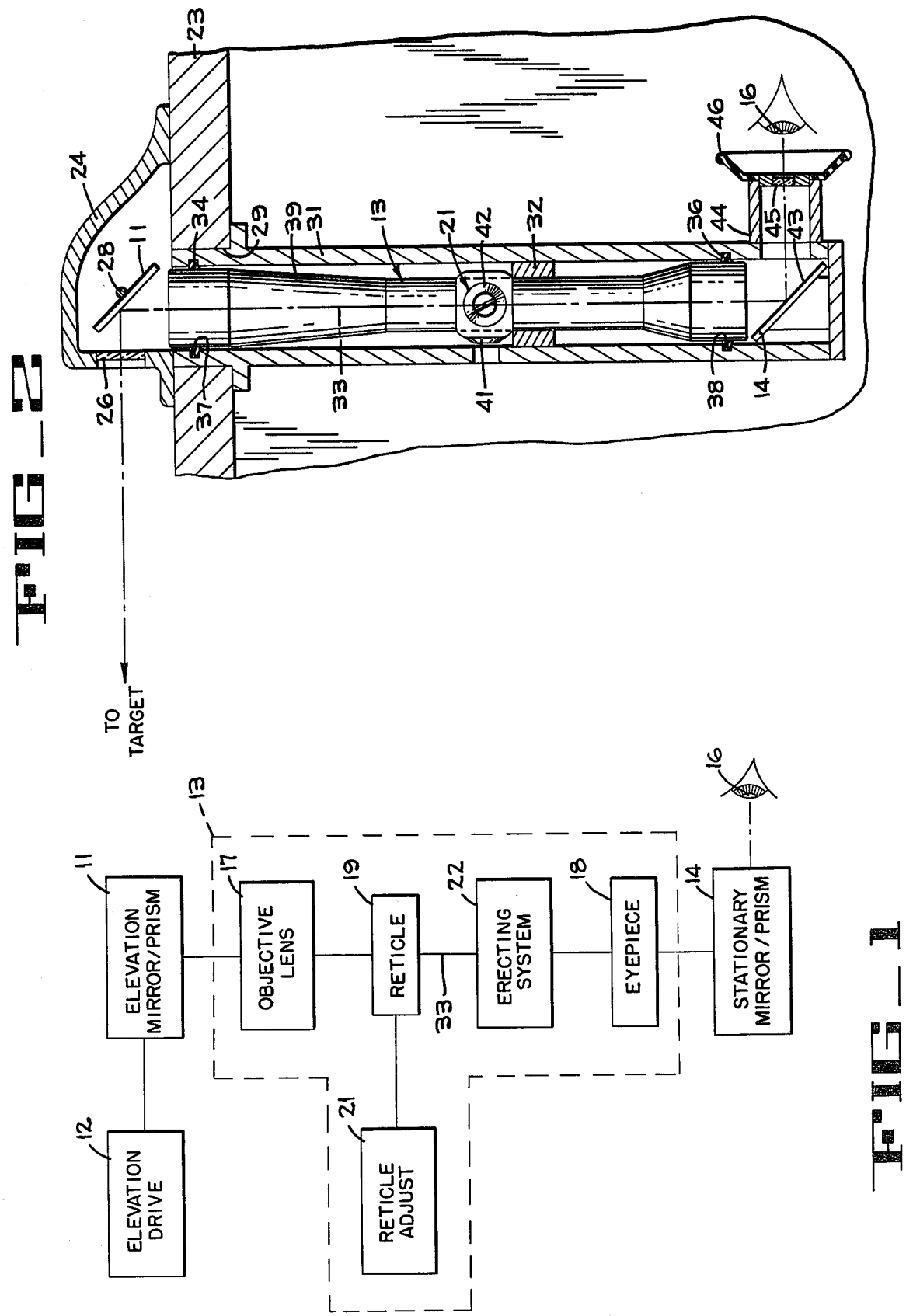

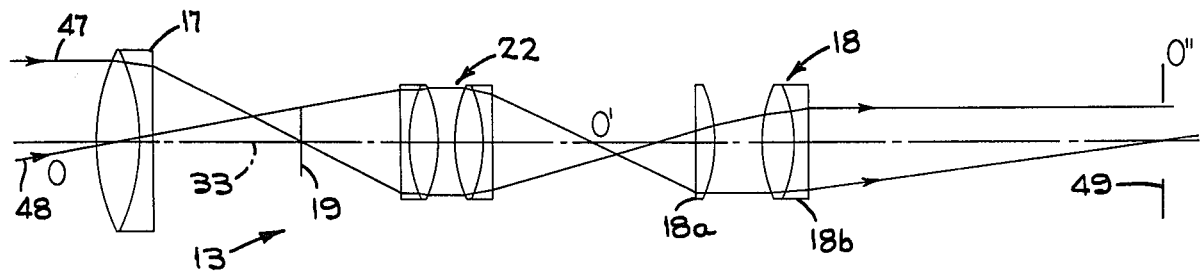
FIG_3
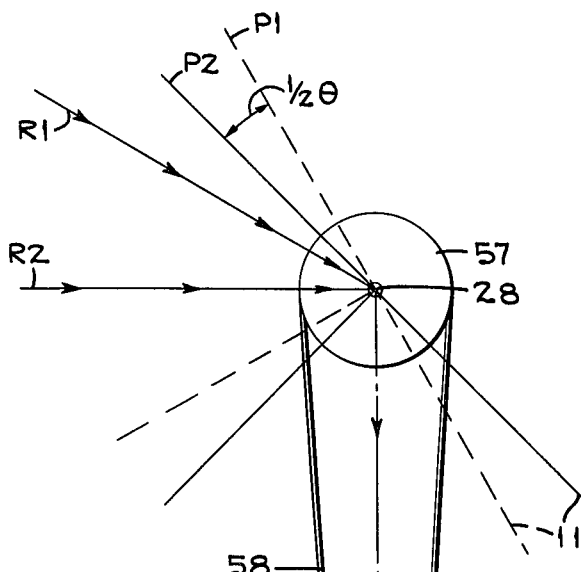
FIG_4
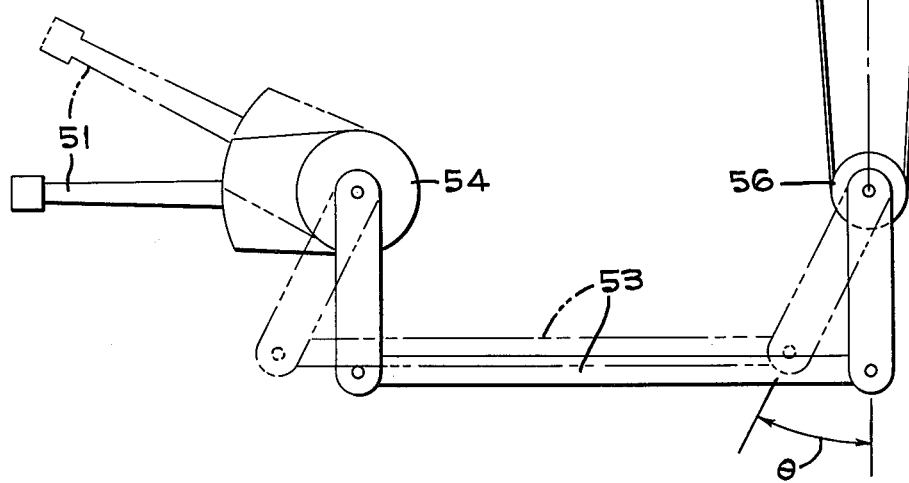

PERISCOPIC SIGHT WITH A UNITARY LENS SYSTEM

BACKGROUND OF THE INVENTION

1. Field of the Invention

This invention relates to a periscopic sight and more particularly to such a sight wherein long eye relief is provided without diminishing the field.

2. Description of the Prior Art

The word periscope means literally "to look around" and is applied to instruments for observing out of or into otherwise virtually inaccessible locations. Periscopes may vary from simple "over the wall" periscopes, consisting of two plain mirrors, to periscopes containing elaborate telescopic lens systems. In present day armored vehicles periscopes are furnished for the crew members for general observation and also for gun sighting. The simple mirror arrangement can be used for general viewing, but the gun sighting applications usually require a telescopic lens system with moderate magnification. The guns are mounted in turrets which are movable in azimuth relative to the vehicles. The guns are also movable in elevation within the turrets. The gun sighting periscopes are provided with an elevation scanning prism at the top to direct the images toward an objective lens and a stationary prism at the bottom to direct the objective image toward an eyepiece at an observer's station. Seals are required between the elevation prism and the objective lens as well as between the elevation prism and the surrounding environment. The objective lens, the stationary bottom prism and the eyepiece lens must also all be sealed from the surrounding environment so that moisture is prevented from fogging any of the surfaces in the lens system. Periscopic sight systems of the type described hereinabove either require that the observation point be relatively close to the eyepiece, due to short eye relief, or they require complex and expensive constructions due to the requirement for long eye relief.

SUMMARY OF THE INVENTION

The periscopic sight of the present invention includes a unitary sealed lens system having a generally vertical lens axis therethrough and including optically positive objective erector and eyepiece lens groups providing a magnification power greater than one and maximum eye relief dimension attainable from the lens groups. A top reflector is optically exposed to objects to be sighted and is aligned to intercept one end of the lens axis. A bottom reflector is optically exposed to an observer position and is aligned to intercept the other end of the lens axis at a position which is spaced from and below the eyepiece. Top and bottom enclosures surround the top and bottom reflectors respectively. The bottom reflector is spaced from the lower end of the lens system and is also positioned within the eye relief dimension. An upper moisture impervious seal is disposed between adjacent surfaces of the upper enclosure and the upper end of the sealed lens system while a lower moisture impervious seal is disposed between adjacent surfaces of the lower enclosure and the lower end of the sealed lens system. In this fashion moisture is prevented from collecting on the lens surfaces external to the sealed system as well as the top and bottom reflectors.

BRIEF DESCRIPTION OF THE DRAWINGS

FIG. 1 is a block diagram showing the interrelation of the various components of the periscopic sight disclosed herein.

FIG. 2 is a fragmentary section through a gun station showing the periscopic sight disclosed herein.

FIG. 3 is an optical lens diagram typifying a lens arrangement within the unitary sealed lens system of the present invention.

FIG. 4 is a diagrammatic presentation of the mechanical coupling between the elevation mirror of the periscopic sight of the present invention and a controlled gun rotor.

DESCRIPTION OF THE PREFERRED EMBODIMENT

The block diagram of FIG. 1 depicts the periscopic sight of the present invention which will be seen to include an elevation reflector 11, which may comprise a mirror or a prism and which is arranged to be moved rotationally about an elevation axis by an elevation drive 12. Light approaching the elevation reflector from a particular direction is reflected into the objective end of a unitary sealed lens system 13 along a lens axis extending, in a vertical direction, therethrough. The light exits from an eyepiece end of the lens system to a stationary reflector 14, which may comprise a mirror or prism and which is displaced some predetermined distance from the eyepiece end of the lens system. The stationary reflector reflects an image to an observation point 16 where the image can be viewed by the observer and which is, of necessity, positioned some distance from the stationary reflector.

The unitary lens system 13 has an objective lens 17, as seen in FIG. 1, at the objective end thereof and an eyepiece 18 at the eyepiece end thereof. Disposed between the objective lens and the eyepiece is a reticle 19 providing a crosshair reference within the lens system field relative to which a gun used in conjunction with the periscopic sight may be bore sighted. A reticle adjust mechanism 21 is provided by which the reticle 19 may be moved within the field of the lens system. The reticle adjust may take any one of the forms well known to those skilled in this art. An erecting lens system 22 is provided between the objective lens and the eyepiece for the purpose of erecting the inverted image provided by the objective lens. In this fashion, a terrestrial telescope is provided as a unitary sealed lens system which may, for example, comprise a commercially available rifle scope such as the Redfield Accu-trac ™, a low profile, wide field rifle scope manufactured by Redfield Co. of Denver, Colo.

In FIG. 2 of the drawings a section of armor plate 23 such as that provided for a gun turret station in an armored vehicle is shown for providing a mounting for the periscope of the present invention. An external housing 24 is provided having a front viewing window 26. The elevation reflector, which comprises a mirror 11, is mounted within the external housing and is rotatable therewithin about an elevation axis 28. An aperture 29 is formed in the armor plate 23 within which is fixed a periscopic sight housing 31. The unitary sealed lens system 13 is mounted within the periscopic sight housing by means of a mounting block 32. The lens system has a lens axis 33 extending therethrough which intersects the elevation mirror 11 substantially perpendicular to the elevation axis 28. The sealed lens system 13 is engaged within the periscopic sight housing 31 at the upper and lower ends by means of "O" rings 34 and 36 carried in "O" ring grooves 37 and 38, respectively, formed in the inner wall of the housing. The "O" ring 34 serves to isolate the mirror 11 and the inner surface of the viewing window 26 from moisture in the surrounding environment. A sealing case 39 is provided for the lens system operating to structurally support the lenses and reticle (described in conjunction with FIG. 1) in predetermined spaced relationship. The reticle adjust mechanism 21 is accessible at the exterior of the lens system sealing case, appearing as rotating adjustment knobs 41 and 42. The knobs 41 and 42 may be rotated by a tool, such as a screwdriver, from externally of the housing 31. The stationary reflector of the bottom of the periscope, which is comprised of a mirror 14, is shown mounted within the periscopic sight housing 31 adjacent to the eyepiece end of the lens system 13 so that a predetermined distance exists between the eyepiece and a reflective surface 43 on the mirror 14. When a mirror is used as the stationary reflector, it is preferably a first surface mirror, such as that shown in FIG. 2, so that secondary reflections are avoided. In the event a prism is used as the stationary reflector, the reflective surface should be on the diagonal, i.e., sloped parallel to the reflective surface 43 shown in FIG. 2. The periscopic sight housing 31 has an eye rest tube 44 projecting horizontally from the lower end thereof. The tube 44 has a path therethrough aligned with the reflected light from the reflective surface 43 and extending through an eye rest window 45 toward the observation station 16. The "O" ring 36 serves to isolate the mirror 14 and the inner surface of the eye rest window 45 from moisture in the surrounding environment. The eye rest tube has a yieldable protective cup 46 around the end thereof to prevent injury to an observer should the observer be pitched forwardly into the periscopic sight.

In FIG. 3 the lenses included in the unitary sealed lens system 13 are shown having their lens axes coinciding with the lens axis 33 of the lens system. The objective lens 17 is shown with a light ray 47 parallel to the lens axis impinging on the lens and crossing the lens axis at the focal plane of the objective lens. The reticle 19 is shown positioned at the focal plane of the objective lens. A principal or chief ray 48 is shown passing through the center of the objective lens and impinging upon the periphery of the erecting lens assembly 22. The erecting lens system has two doublet lenses as shown in this embodiment. The rays 47 and 48 from an object in front of the objective lens 17 are presented in erect orientation to the eyepiece 18, consisting in this illustration of a field lens 18a and an eyepiece lens 18b. The telescopic lens arrangement of FIG. 3 provides a given magnification, a large exit pupil, and a long eye relief. Rugged mechanical construction is provided by virtue of the lens system sealing case 39 (FIG. 2) which rigidly supports the lens components therein in predetermined spaced relationship.

In a lens system such as that seen in FIG. 3 there is an aperture which limits the size of the axial cone of energy transmitted from an object located to the left of the objective lens 17. This limiting aperture is called the aperture stop and is located along the lens axis 33 at the point O' having the diameter of the axial cone of rays at O'. The principal ray 48 passes through the center of the aperture stop. That space on the objective side of the lens system is referred to as the objective space and that space on the eyepiece side of the lens system is referred to as the image space. Every optical lens system is really two systems, each system consisting of the same optical elements. One system forms a series of images of the object and the other system forms a series of images of the aperture stop. When the lens system is designed for use by an observer is visually covering a field of view, the optimum point for the observer to place his eye is termed the exit pupil. The exit pupil of a lens system is defined as the location of the image of the aperture stop in the image space, which is seen at O" in FIG. 3. Note that the exit pupil is located by the intersection of the principal ray 48 and the lens axis 33 behind the eyepiece 18. The exit pupil diameter is the diameter of the axial ray bundle at the exit pupil. The displacement of the plane containing the exit pupil from the eyepiece of a lens assembly is termed the eye relief. A large displacement constitutes long eye relief. In accordance with the present invention, long eye relief and a relatively large exit pupil are provided by the unitary lens system.

The location of the exit pupil for the lens array of FIG. 3 depends on the location of the image O' of the objective lens O. The farther the point O' is located to the right (FIG. 3) of the erecting lens system 22, the greater will be the eye relief. Eye relief can be decreased by placing a field lens at the focal plane of the objective lens 17. The stronger the field lens is made, that is, the more it bends light rays impinging thereupon, the more the point O' will be moved to the left in FIG. 3. Elimination of the field lens at the focal plane of the objective lens provides for maximum eye relief, as in the lens array shown. The exit pupil is illustrated by the aperture 49 of FIG. 3. The eye relief for this particular lens assembly is therefore seen as the distance from the eye-piece 18 to the exit pupil at O" along the lens axis 33.

One manner in which a gun 51 mounted in an armored turret may be aligned with the elevation mirror 11 of the periscopic sight is shown in FIG. 4. A parallel bar drive linkage 53, which is well known in this art, is coupled between the gun rotor 54 and an elevation mirror drive sheave 56. The gun 51 is fixedly mounted to the gun rotor to move in elevation therewith. An elevation mirror angle reducing sheave 57 is mounted on the elevation axis 28 wherein it is coupled to the elevation mirror 11. A taut metal band 58 is routed around the drive sheave and the reducing sheave. The reducing sheave has a diameter which is twice that of the drive sheave; consequently, when the drive sheave rotates through an angle $\theta$ (as shown in FIG. 4), the reducing sheave rotates through an angle of $\frac{1}{2}\theta$. This angular reduction is necessary (as illustrated in FIG. 4) because rotation of the elevation mirror 11 through an angle of $\frac{1}{2}\theta$ will provide for a change through the angle $\theta$ for light impinging on the surface on the elevation mirror 11 and reflected along the lens axis 33. This may be seen by reference to FIG. 4 where the ray R1 approaches the surface of the elevation mirror 11 from an angle 30 degrees above the horizontal and is reflected on the lens axis 33 when the elevation mirror is positioned at an angle 60 degrees above the horizontal as seen at P1. The ray R1 extends along a direction parallel to the elevation of the gun barrel 51 shown in dashed lines in FIG. 4. When the gun barrel is depressed to the horizontal, as seen in solid lines in FIG. 4, the reflecting surface of the elevation mirror 11 will be depressed to an angle 45 degrees above the horizontal (as shown by line P2) so that horizontal rays represented by line R2 are reflected thereby along the lens axis 33. It may therefore be seen that when the gun 51 is depressed 30 degrees, the reflective surface of the elevation mirror 11 must be depressed only 15 degrees to the position shown for the rays impinging thereupon from the direction in which the gun is pointing to continue to be reflected down the lens axis 33.

An armored vehicle periscope has been described which includes a unitary lens system such as provided by a commercial rifle scope. The rifle scope includes the image forming optics, a reticle and reticle adjust mechanism, and a rugged sealed housing. The lens system may include zoom lenses, if desired. The long eye relief, generally about three inches or more, allows a stationary prism or first surface mirror to be located behind the eyepiece to turn the light rays from vertical to horizontal without interfering with the exit pupil.

Although the best mode contemplated for carrying out the present invention has been herein shown and described, it will be apparent that modification and variation may be made without departing from what is regarded to be the subject matter of the invention.

What is claimed is:

1. A periscopic sight, comprising
a unitary sealed lens system having a generally vertical lens axis extending therethrough,
optically positive objective, erector and eyepiece lens groups aligned on said lens axis,
said lens system having a magnification power greater than one and providing maximum eye relief dimension attainable from said lens groups,
a top reflector optically exposed to objects to be sighted and aligned to intercept an upper end of said lens axis,
a top enclosure surrounding said top reflector,
a bottom reflector optically exposed to an observer position and aligned to intercept a lower end of said lens axis,
a bottom enclosure surrounding said bottom reflector,
said bottom reflector being spaced from the lower end of said sealed lens system and being positioned within said eye relief dimension,
an upper moisture impervious seal disposed between adjacent surfaces of said top enclosure and said sealed lens system,
and a lower moisture impervious seal disposed between adjacent surfaces of said bottom enclosure and said sealed lens system, whereby moisture from the surrounding environment is prevented from collecting on the external surfaces of said objective and eyepiece lens groups and said top and bottom reflectors.

2. A periscopic sight according to claim 1 including means for rotating said top reflector about a generally horizontal axis.

3. A periscopic sight for use in directing a gun having a gun rotor attached thereto which is movable in elevation and mounted on an armored compartment, said sight comprising an elevation reflector in optical communication with objects to be sighted mounted on the exterior of the armored compartment, a top enclosure surrounding said elevation reflector, means connecting said elevation reflector to said gun rotor for rotating movement about a generally horizontal elevation axis, a sealed unitary erecting lens system containing optically positive lens groups only, said lens system having a sealing and supporting case with an object end and an eyepiece end mounted within the compartment in a generally vertical orientation and having a lens axis therethrough aligned with a generally vertical light path through the compartment wall, said lens system further having a magnification power greater than one and providing the maximum obtainable eye relief dimension from said optically positive lens groups, said lens axis intersecting said elevation reflector in a direction substantially perpendicular to said elevation axis, said means connecting the elevation reflector to the gun rotor being arranged to drive said elevation reflector at substantially one half the angular elevation rate of the gun rotor, a stationary reflector in optical communication with an observer's position and mounted below the eyepiece end of said sealing case to intercept said light path, a bottom enclosure surrounding said stationary reflector, said stationary reflector being spaced from said eyepiece end within said eye relief dimension for reflecting light toward said observer's position in a generally horizontal path from said vertical light path, an upper moisture inpervious seal disposed between the adjacent surfaces of said top enclosure and the object end of said sealing and supporting case, and a lower moisture impervious seal disposed between adjacent surfaces of said bottom enclosure and the eyepiece end of said sealing and supporting case, whereby moisture from the surrounding environment is prevented from reaching said reflectors and the external surfaces of said lens groups.

4. A periscopic sight as in claim 3 wherein said elevation and stationary reflectors are first surface mirrors.

5. A periscopic sight as in claim 3 wherein said elevation and stationary reflectors are prisms.

6. A periscopic sight as in claim 3 wherein said unitary erecting lens system includes an objective lens, a reticle, an erecting lens and an eyepiece.

7. A periscopic sight comprising a casing, a top reflector positioned at the upper end of said casing in communication with light rays from objects to be sighted and to reflect the rays downwardly along a generally vertical axis, a top enclosure surrounding said top reflector a bottom reflector positioned at the lower end of said casing and arranged along said axis to receive said light rays and direct them in a generally horizontal direction to an observer's position, a bottom enclosure surrounding said bottom reflector, a rifle scope having a unitary sealed case and containing optically positive lens groups only and providing the maximum obtainable eye relief dimension from said optically positive lens groups, said rifle scope having a magnification power greater than one and being positioned in said casing between and spaced from said top and bottom reflectors, said bottom reflector being positioned within said eye relief dimension and said vertical axis being coincident with the lens axis of said rifle scope, a top moisture impervious seal disposed between adjacent surfaces of said top enclosure and one end of said rifle scope, and a bottom moisture impervious seal disposed between adjacent surfaces of said bottom enclosure and the other end of said rifle scope.

* * * * *